United States Patent Office 3,384,979
Patented May 28, 1968

3,384,979
SYSTEM FOR EVAPORATING AND COOLING
A LIQUID INJECTED IN VACUO
Paul Laine, Sevres, and Jean-Claude Guillaume, Nice,
France, assignors to Centre National de la Recherche
Scientifique, Paris, France
Filed Aug. 24, 1966, Ser. No. 574,651
Claims priority, application France, Aug. 28, 1965,
29,774
2 Claims. (Cl. 34—92)

ABSTRACT OF THE DISCLOSURE

A system for extracting solid substance from liquid by freezing or concentrating in vacuo a liquid divided into droplets comprising an enclosure holding a vacuum suitable for the purpose, means for injecting the liquid to be processed upward to such a height that the rise and dropback time is adequate to allow the freezing or concentration to take place, said means including a nozzle for injecting the liquid in the vacuum in the lower portion thereof, said nozzle being directed upward so that the liquid is injected upward and the height of the enclosure being such that the injected liquid does not come into contact with the upper part of the enclosure and is permitted to fall freely within the enclosure and wherein the system includes means for subjecting the nozzle to vibration at a frequency of more than 1,000 cycles per second or means for pulsing the injection at a frequency more than 1,000 cycles per second.

---

The invention relates to a process and a system for evaporating and, if need be, freezing a liquid injected in a more or less hard vacuum, the injection being so performed that the liquid is divided into small particles (droplets).

The purpose of evaporation in vacuo may consist in concentrating a substance in a volatile solvent through partial evaporation of the latter or extraction of a substance in solution in such a solvent through complete evaporation of the said solvent.

However, the preferred, though not limitative application of the invention is freezing of a liquid formed into droplets to be, if need be, lyophilized later.

When a liquid is injected in an enclosure wherein the pressure obtaining is lower than the vapour pressure of that selfsame substance in the solid state, a surface-evaporation effect occurs instantly, that cools and solidifies this liquid, and the resulting solid cooling down to a temperature at which (if the substance receives no heat energy from outside), its vapour pressure equates the pressure obtaining in the aforesaid enclosure.

Forming the liquid into droplets by injection within the enclosure enables to obtain frozen droplets which are more or less spherical.

Freezing liquids consisting of droplets by injecting them in vacuo has already been attampted, the vacuum being kept up either by a large-capacity pumping system, for instance, an ejector, or by grouping together a cold source (on which the vapour released by the injected material freezes), and a vacuum pump sucking up the non-condensable gases released by the said material. These processes did not yield good results because the liquid, being injected downwards at a fairly high initial velocity, it was necessary that these droplets be very finely divided, in order that the freezing process described supra could come about before the frozen droplets impinged against a wall of the apparatus. Under those conditions, the frozen material was partly carried off out of the apparatus by the stream of vapour, and thus wasted.

The chief purpose of this invention is to increase the time the injected liquid is in vacuo prior to impinging against a wall of the apparatus in which the vacuum obtains and this, without increasing—and even reducing the height of the enclosure.

The feature of this process, according to the invention herein, is that the liquid injected upwards in the enclosure in vacuo and at such a height that the rise and drop-back time of the material is adequate to obtain the required freezing or concentration.

The system described herein features the provision of one or several nozzles in the lower portion of the enclosure in vacuo which have their outlets pointing upwards so that the liquid is also injected upwards and the height of the enclosure such that the injected material does not come into contact, at the apex of its path, with the upper cover of the enclosure but may drop freely within the latter.

When the device described herein is used for freezing droplets unseeded beforehand with crystal nuclei, injection must be so arranged that fine division into droplets occurs before initial supercooling of the liquid ceases.

Should the evaporated liquid leave a dry residuum likely to form a membranous layer over the jet, formation of the latter into droplets should be furthered even before super-cooling of the liquid ceases, either by imparting a vibratory motion to the injection nozzle or fast pulsing of the jet.

The invention herein permits of obtaining frozen spherules large enough as to do away with any chance of their being carried off by the stream of vapour resulting from the partial vapourization of the liquid injected. In this way, in an apparatus two metres high, water divided in droplets about one millimetre in diameter, coffee and milk divided likewise in droplets of several tenths of a millimetre were obtained, a highly suitable particle-size for subsequent lyophilization of milk and coffee.

The finely-divided liquid to be frozen need not be an aqueous solution. For instance, it may be any liquid for example an ammonia solution to be subsequently lyophilized, provided that the exaporative pressures achieved and the temperature of the cold sources on which the vapours of the solvent solidify be fairly low.

The invention herein also relates to an experimental apparatus for working out various parameters needed for making and/or operating the evaporative and freezing system relating to the invention.

The description and drawings infra evince the details of an embodiment of the invention herein:

FIGURE 1, in the appended drawings, shows diagrammatically the centre cross-section of an embodiment of the invention that yields virtually spherical, frozen droplets.

Figure 1:
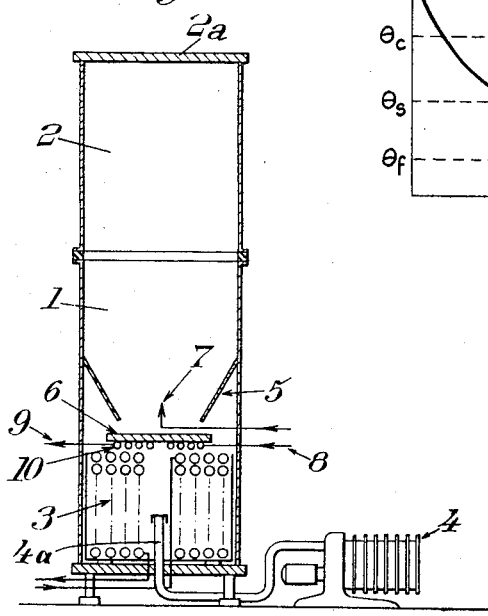

As shown in FIGURE 1, the freezing system comprises a vacuum enclosure made up, in this instance, of two shell rings joined one above the other by a seal. The top of the vertical, cylindrical enclosure is closed by the cover 2a. In the lower part of the enclosure is the coil 3 through which flows calcium chloride brine, the temperature of which can be lowered down to −40° C. This coil is the cold source. Vacuum is brought about by the vacuum pump 4 which may be, for instance, a two-stage vane pump, discharging in the ambient air.

The ice particles brought about drop onto the chute 5, located above the plate 6.

The liquid to be frozen is injected into the enclosure via a nozzle 7 in the lower portion of the enclosure 1, 2, the nozzle opening pointing upwards.

As explained further on, the diameter of the nozzle 7, the temperature of the cold source and the value of the vacuum depend, of course, on the liquid to be frozen.

The device, set forth in FIG. 1, works as follows:

After starting the pump 4, and the coolant flowing in the coil 3, the liquid to be frozen is injected through the nozzle 7. The liquid rises in vacuo within the enclosure and divides into droplets. The incoming pressure must be so devised that the droplets rise up close to the upper cover of the enclosure without, however, reaching it. The rising motion of the liquid is gradually slowed down until it is nil at the apex of its rise. Then, the droplets formed by the liquid drop back and are speeded up to a rate which, at the level of the injection nozzle, is virtually equal to but of converse sign to the rate of injection. The time the injected material is in motion in vacuo equates, under such conditions, twice the free-fall time of any substance in vacuo, having no initial velocity and of same height as the apex of the motion of the injected particles. Freezing of the droplets occurs during this period of time. The frozen droplets drop, first, onto the chute 5 and, next, onto the plate 6, while the vapours and non-condensed gases flow through the ring-like space between the chute 5 and the plate 6. The vapours freeze in the coil and the non-condensable gases are sucked up by the pump 4 via the pipe 4a, located in the centre-line of the apparatus and opening below the plate 6.

Figure 2:
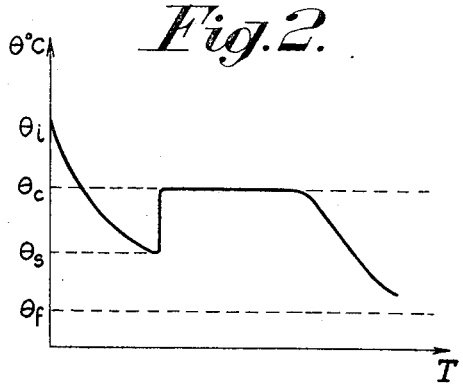
FIGURE 2 is a diagram showing some operating conditions of the apparatus illustrated in FIG. 1.

The diagram in FIGURE 2 shows schematically the surface temperatures time-dependent changes of the droplets whilst the liquid is in motion through the enclosure 1, 2.

In this figure:

$\theta i$ denotes the initial temperature of the liquid;
$\theta s$ denotes the supercooling limit-temperatures;
$\theta c$ denotes the freezing temperature;
$\theta f$ denotes the final temperature of the solid phase.

Formation into droplets of the liquid jet injected in the vacuum enclosure must occur before supercooling ceases.

If the liquid to be divided into droplets and to be frozen is water the temperature of which equates the ambient's and the nozzle used is a copper capillary tube with an inner diameter of 0.5 to 1 millimetre and the temperature of the cold source 3 set to −25° C., ice spherules from several tenths to one millimetre are obtained. Five to ten centimetres from the orifice, the jet of water forms into droplets which freeze out during the rising stage of their path, (the whole jet visibly becoming opaque). The height of the jet is of the order of two metres.

Application of the system embodied according to the invention herein is especially suitable for obtaining frozen spherules for subsequent lyophilization. These spherules may consist of an aqueous solution of coffee or tea, or of milk, skim-milk especially, or any other liquid.

To promote division into droplets, particularly that of liquids the evaporation of which yields a dry residuum, it was found beneficial to cause the nozzle 7 to vibrate or to pulse the injection. The range of frequency of the vibratory motion or of the pulses can be a wide one, reaching, if need be, several thousand cycles per second and extending even into the ultrasonic range.

The vibrations may be directed crosswise or lengthwise with respect to the nozzle. They may be generated by any suitable means. For instance, the injection nozzle may be fastened on a vibrating member such as one of the prongs of a tuning-fork so arranged that its natural-frequency vibrations are kept up by electrical means.

Lyophilization of the frozen droplets can be carried out in an apparatus other than that in which it was frozen. If an apparatus such as illustrated in FIG. 1 is available, lyophilization can take place therein by setting under the plate 6 the coil 10 through which flows a liquid incoming via the tube 8 and outgoing via the tube 9, the temperature of that liquid being such that it conveys to the material to be lyophilized, which is on plate 6, the amount of heat needed for lyophilizing.

Figure 3:
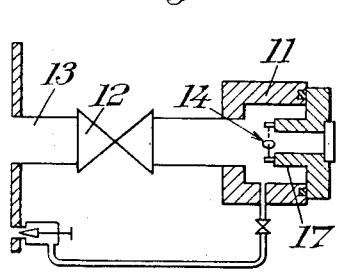
FIGURE 3 is a diagrammatical cross-section of a device for scrutinizing the freezing effect of a droplet of liquid when injected in vacuo and whereby conclusions may be inferred for the embodiment of a freezing device of the apparatus constructed as per the invention herein.
Figure 4:
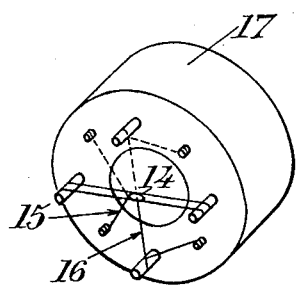
FIGURE 4 is a view in perspective of a portion of the device depicted in FIGURE 3.

To determine the height of the enclosure 1, 2, the pressure under which the liquid is to be injected inside it and the temperature of the coolant flowing in the coil 3, and hence the time needed for the injected droplets to pass through the vacuum, it is best to proceed with tentative testing by means for instance, of the device shown in FIGS. 3 and 4. The device comprises the small cylindrical reservoir 11 of, say, 40 millimetres in diameter and 50 millimetres long, which connects, via the quick-opening valve 12, the pipe 13, 20 millimetres in diameter, which is welded to the lower portion 1 of the enclosure.

The testing over, the droplet 14 is held by capillary attraction to a round loop 2 millimetres in diameter and made of an enamelled-copper wire 0.1 millimetre in diameter. These components are fastened to the cylinder 17 which is integral with the cylindrical reservoir 11. When the diameter of the droplet is 2.5 millimetres, it is virtually spherical. The two thermo-electric thermocouples 15 and 16, made up with copper and constantan wires 0.03 millimetre in diameter, operate in conjunction with moving-magnet oscillographs (not shown on the drawing), which have a natural frequency of 175 cycles per second, via direct-current amplifiers for recording on photographic paper, at the speed of 5 centimetres a second, the changes in the surface and the core temperatures, respectively of the droplet.

Figure 5:
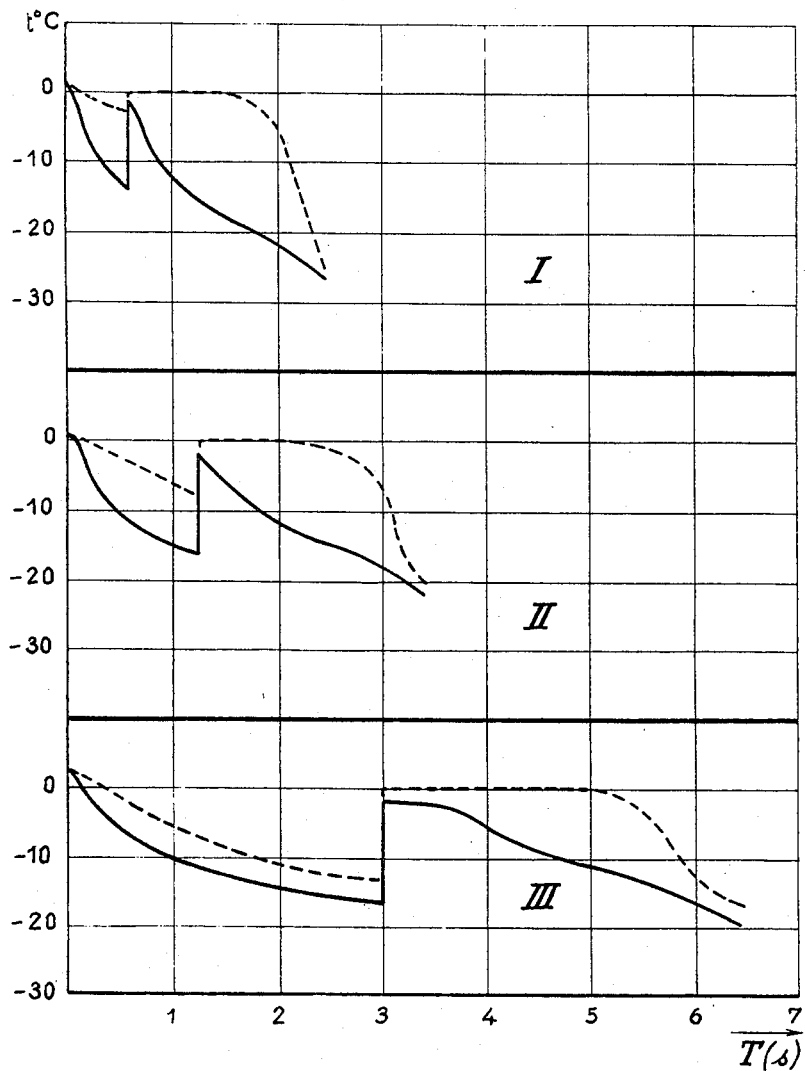
FIGURE 5 shows a family of curves, evincing the results achieved, under various conditions, with the device depicted in FIGS. 3 and 4.

The curves plotted in FIGURE 5 show the development of the temperatures $t$ in terms of the time T (shown in seconds) during the three tentative tests, respectively, I (cold source at −35° C.); II (cold source at −30° C.); III (cold source at −25° C.) the initial temperatures of the droplets being substantially 0° C. (as, were the initial temperature of the droplets higher, subjecting them sharply to the vacuum they would break forth suddenly). The initial pressures equated the maximum water-vapour pressures at the temperatures of −35° C., −30° C. and −25° C., respectively, of the cold source.

The surface temperatures of the droplets (shown in continuous lines, the supercooling effects being over, ranging from −14° C. to −17° C., the cold-source temperatures to apply for making ice spherules, using the process described supra, should be definitely lower than said surface temperatures: the larger the droplets to freeze, the lower should such temperatures be in an apparatus of a given size.

Development of the temperatures in the core of the droplets is shown in dashed lines.

Moreover, these curves evince, at the various temperatures of the cold sources and different vacuum values within the enclosure, the time taken for supercooling and for freezing-in the droplets. These periods of time are essential for determining the height of the enclosure, and hence selection of the injection pressure and nozzle diameter.

It follows that the diameter of the round loop, holding the droplet 14 by capillary attraction, depends on the greater frozen droplet diameter needed.

The devices and applications set forth in the invention herein are in no way limitative; conversely, it covers a wide range of variants. For instance, efficiency could be increased by the provision of several nozzles to inject the liquid to be processed. The cooling member could in the form of several devices mounted sidewise so that one may be defrosted whilst the others are operating. The plate on which are collected the frozen particles, could be replaced by a system whereby processing would be continuous.

We claim:
1. A system for extracting solid substance from liquid by freezing or concentrating in vacuo a liquid divided into droplets comprising an enclosure holding a vacuum suitable for the purpose, means for injecting the liquid to be processed upward to such a height that the rise and dropback time is adequate to allow the freezing or concentration to take place, said means including a nozzle for injecting the liquid in the vacuum in the lower portion thereof, said nozzle being directed upward so that the liquid is injected upward and the height of the enclosure being such that the injected liquid does not come into contact with the upper part of the enclosure and is permitted to fall freely within the enclosure and wherein the system includes means for subjecting the nozzle to vibration at a frequency of more than 1,000 cycles per second.

2. A system for extracting solid substance from liquid by freezing or concentrating in vacuo a liquid divided into droplets comprising an enclosure holding a vacuum suitable for the purpose, means for injecting the liquid to be processed upward to such a height that the rise and dropback time is adequate to allow the freezing or concentration to take place, said means including a nozzle for injecting the liquid in the vacuum in the lower portion thereof, said nozzle being directed upward so that the liquid is injected upward and the height of the enclosure being such that the injected liquid does not come into contact with the upper part of the enclosure and is permitted to fall freely within the enclosure and wherein the system includes means for pulsing the injection at a frequency more than 1,000 cycles per second.

References Cited

UNITED STATES PATENTS

| | | | |
|---|---|---|---|
| 1,478,863 | 12/1923 | Stewart | 62—74 |
| 1,884,429 | 10/1932 | Warner | 62—347 |
| 2,009,283 | 7/1935 | Warner | 62—347 |
| 2,100,151 | 11/1937 | Tietz | 62—347 |
| 2,471,035 | 5/1949 | Hurd | 34—92 |
| 2,515,098 | 7/1950 | Smith | 34—5 |
| 2,994,132 | 8/1961 | Neuman | 34—5 |
| 3,052,557 | 9/1962 | Vidal | 62—74 |
| 3,233,333 | 2/1966 | Oppenheimer | 34—92 |

WILLIAM J. WYE, *Primary Examiner.*